Aug. 25, 1959    W. T. TEAGLE    2,901,257
AGRICULTURAL MACHINES
Filed Jan. 23, 1956    2 Sheets-Sheet 1
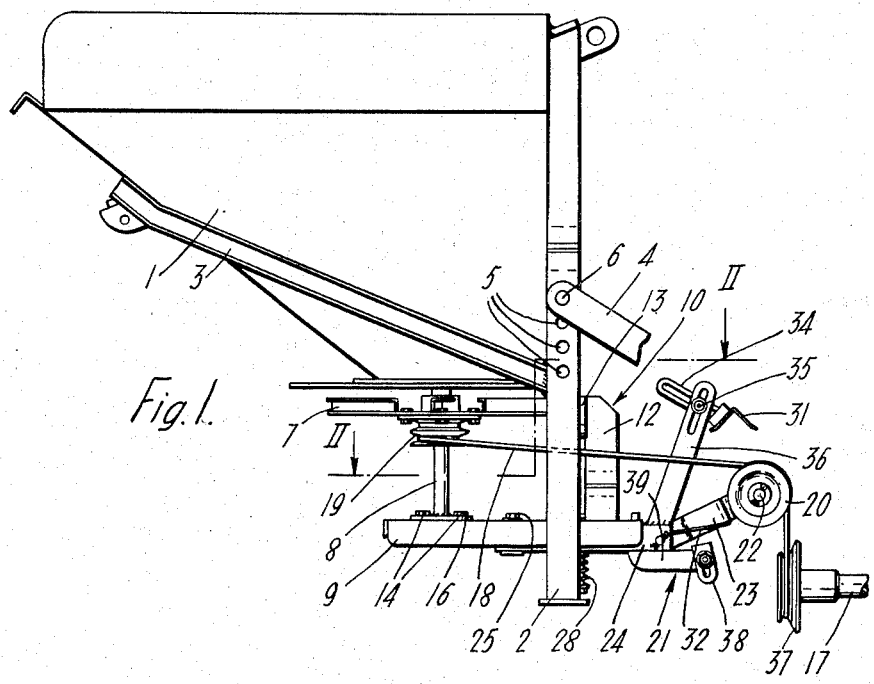
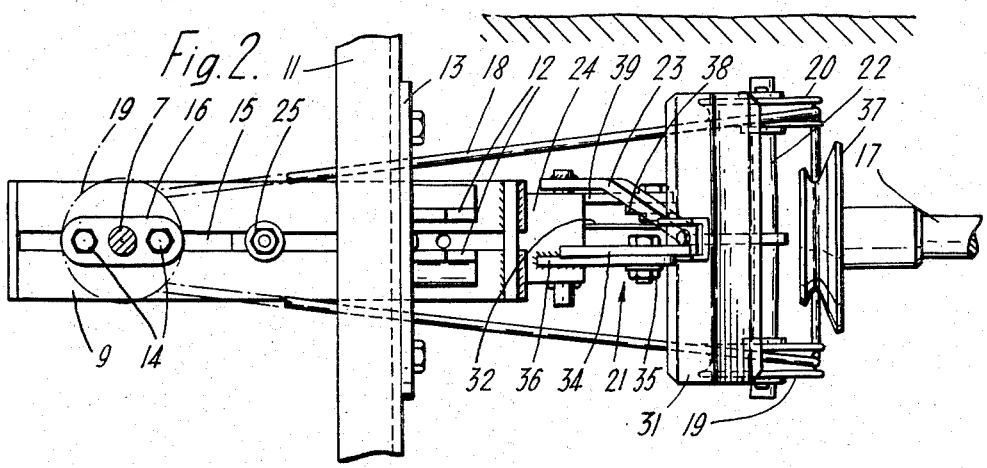
Inventor
William T. Teagle
By
Attorneys Aug. 25, 1959 W. T. TEAGLE 2,901,257
AGRICULTURAL MACHINES
Filed Jan. 23, 1956 2 Sheets-Sheet 2
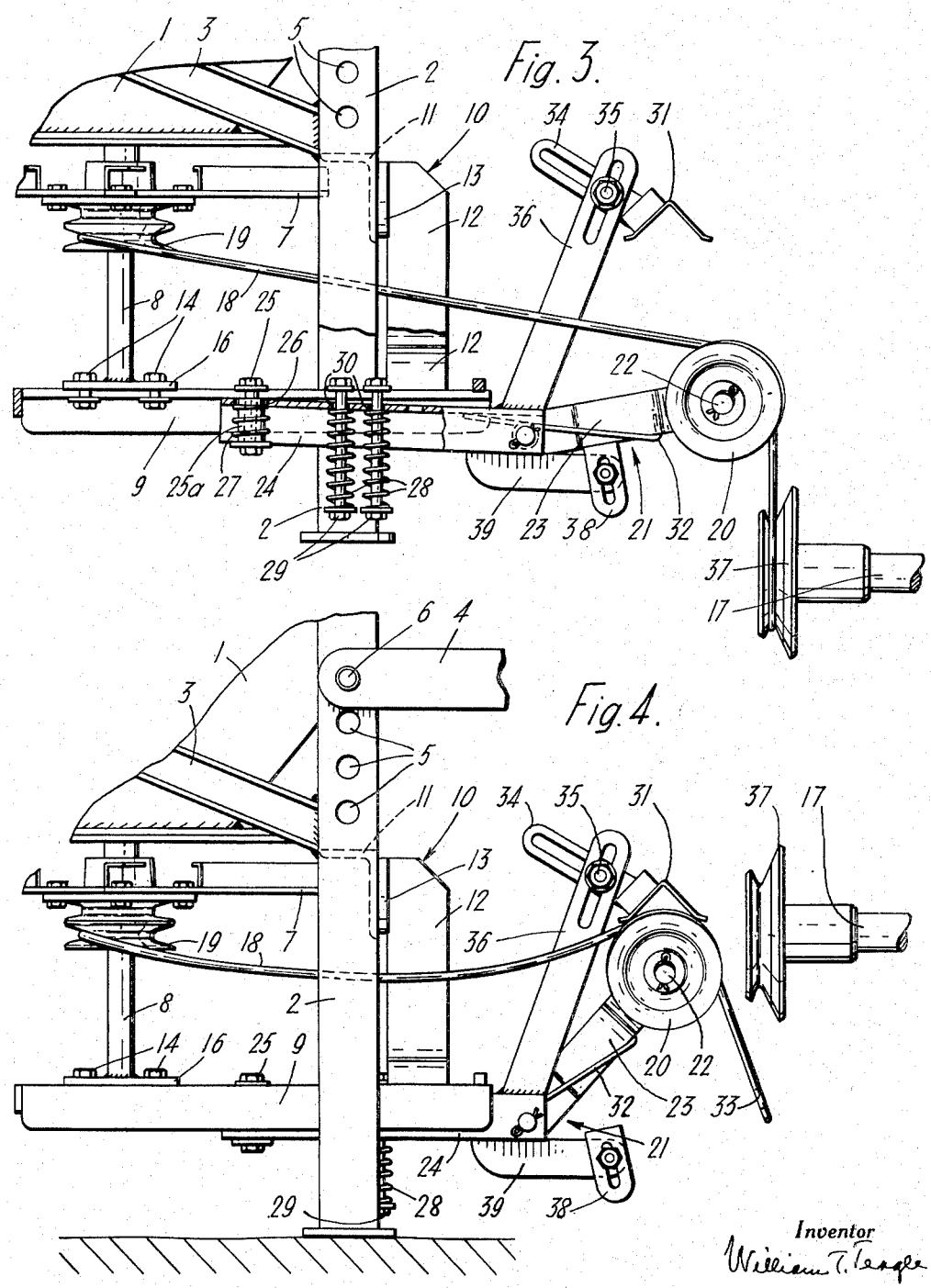
Inventor
William T. Teagle
By
Attorneys United States Patent Office 2,901,257
Patented Aug. 25, 1959

2,901,257

AGRICULTURAL MACHINES

William T. Teagle, Blackwater, Truro, England
Application January 23, 1956, Serial No. 560,808

Claims priority, application Great Britain
January 28, 1955

2 Claims. (Cl. 275—8)

This invention relates to agricultural machines of the kind which is adapted to be carried on an hydraulic lift on a tractor and be movable vertically thereby between inoperative and operative positions, and which embodies a rotary device that is adapted to be driven by a power take-off shaft on the tractor through a belt and pulley transmission system. Included in machines of this kind are broadcasters in which a rotary device is used for distributing seed, fertiliser or other granular or powdered materials onto the ground, weed-cutting and like machines in which a rotary cutting tool is employed, and spraying machines.

The invention is particularly applicable to a broadcasting machine of the above kind, which is adapted to be raised by the hydraulic lift of a tractor from a loading position into an operating position, and which has a belt and pulley system for transmitting drive from the tractor's power take-off shaft to the rotary distributor of the machine.

The object of the present invention is to provide, in a machine of the above character, an improved belt and pulley transmission system having means whereby the drive to the rotary device of machine is automatically disconnected when the machine is moved by the hydraulic lift into its inoperative position, and automatically reconnected when the machine is moved into its operative position.

According to the invention, in a machine of the kind referred to which is adapted to be carried on an hydraulic lift on a tractor and be moved vertically thereby between inoperative and operative positions, and which has a belt and pulley system for transmitting drive from a power take-off shaft on the tractor to a rotary device on the machine, the belt and pulley system includes a driven pulley fast with said rotary device, a belt passing round said driven pulley, and a pair of resiliently mounted idler pulleys for guiding the belt round a driving pulley on the power take-off shaft, and means are provided which are adapted to cooperate with said idler pulleys so as to form a bight in the belt for engagement with said driving pulley when the machine is moved into its operative position, and for causing the disengagement of the belt from said driving pulley when the machine is moved into its inoperative position.

Reference will now be made to the accompanying drawings which illustrate a preferred embodiment of the invention as applied to a broadcasting machine, and in which Fig. 1 is a side view of the machine in its operative position, Fig. 2 is an enlarged fragmentary plan view taken on the line II—II of Fig. 1, Fig. 3 is an enlarged fragmentary side view of the machine in its operative position, with parts broken away and Fig. 4 is a view similar to Fig. 3, showing the machine resting on the ground in its inoperative or loading position, with parts omitted.

In the construction illustrated the machine has a frame on which a hopper 1 is supported and which comprises two vertical legs 2 arranged at the front of the hopper and to the sides thereof, and a pair of arms 3 extending from the legs to the rear of the hopper. The legs are adapted to be attached to the forked arms 4 of the hydraulic lift on the rear of a tractor and are arranged to support the machine on the ground when it is lowered by the hydraulic lift into its inoperative or loading position, as shown in Fig. 4. For their attachment to the arms 4 the legs 2 are each formed with a vertical series of holes 5 to receive the horizontal pins, shown at 6, which are usually provided on the forked arms of an hydraulic lift. The provision of a series of holes permits vertical adjustment of the operative position of the machine in relation to the tractor. At the base of the hopper there is provided a controlled outlet (not shown) for the discharge of material from the hopper onto a rotary distributor 7 which is situated immediately below the outlet. The latter is controlled by any suitable means, for instance that constructed in accordance with the invention which forms the subject of my copending patent application Serial No. 558,561 or even by a manually operable sliding plate arranged to close off any desired area of the outlet aperture. The distributor 7, which can be of any convenient form, is adapted to rotate about a vertical spindle 8 mounted on the rear end of a bar 9 which extends longitudinally of the machine and is rigidly suspended by a short vertical support 10 from a transverse frame member 11 joining the two legs 2. The support 10 can comprise a pair of parallel bars 12 welded at their lower ends to the bar 9 and joined at their upper ends by a transverse plate 13 which is adapted to be bolted to the transverse frame member 11. The spindle 8 is fixed to the longitudinal bar 9 by a pair of bolts 14 extending through a longitudinal slot 15 in the bar and engaging in a flange 16 welded on the lower end of the spindle.

The rotary distributor is driven by the power take-off shaft 17 of the tractor through a belt and pulley transmission system which includes a belt 18, a pulley 19 on the distributor, and a pair of idler pulleys 20 carried on a swinging-arm assembly 21 at the forward end of the bar 9. The idler pulleys are rotatably mounted one at each end of an axle 22 extending transversely of the machine and carried on an arm 23 which is pivoted for angular movement in a vertical and longitudinal plane on the forward end of a second arm 24 that extends longitudinally of the machine beneath the bar 9 and is pivotally attached thereto at its rear end, also for movement in a vertical plane. The second arm 24 and the bar 9 are preferably of inverted channel section, the arm nesting within the bar 9 so as to be guided by the side pieces thereof in its pivotal movement and prevented from any lateral displacement. The forward end of the arm 24 projects beyond the forward end of the bar to provide clearance for the first arm 23 of the swinging-arm assembly. The arm 24 is attached to the bar 9 by a bolt 25 which engages in the slot 15 in the bar and which, together with a spacing sleeve 25a mounted on the bolt so as to abut the undersurface of the bar, extends freely through a hole 26 in the arm 24 to allow the necessary pivotal movement thereof. The swinging-arm assembly can be adjusted longitudinally of the machine by loosening the bolt 25 and sliding it along the slot 15. A coil spring 27 is provided on the bolt 25 to hold the rear end of the arm 24 firmly against the bar 15. Intermediate its ends the arm is pressed upwardly against the bar by a pair of coil springs 28 mounted on bolts 29 which also engage in the slot 15 and which extend with clearance through holes 30 in the arm. A single spring can be used in place of the two springs 28. As will be described later herein, these springs act to tension the driving belt 18.

The driving belt engages round the rear side of the pulley 19 on the distributor and its two runs extend forwardly therefrom to pass one over each of the idler pulleys 20. Mounted above the idler pulleys is a clamping device 31 towards which the pulleys are urged by a torsion spring 32 acting on the first arm 23 of the swinging-arm assembly to bias it relatively to the second arm 24 in an upward and rearward direction. When the machine is resting on the ground in its inoperative position, as shown in Fig. 4, the pulleys are urged into engagement with said clamping device and the two runs of the belt are clamped between it and the idler pulleys so as to be formed into a stiff bight projecting downwardly and forwardly from the idler pulleys, as shown at 33 in Fig. 4. The clamping device is conveniently constructed from a short length of angle iron extending transversely of the machine with the angle uppermost so that the pulleys are received between the sides of the angle and clamp the belt against the inner surfaces thereof. The clamping device is carried on a slotted arm 34 which is adjustably secured by a bolt 35 to another slotted arm 36 welded on the forward end of the arm 24 of the swinging-arm assembly. The arrangement of the slotted arms enables the clamping device to be adjusted vertically and longitudinally of the machine.

The bight thus formed in the belt is held by its inherent stiffness in a position such that when the machine is raised by the hydraulic lift towards its operative position the bight engages beneath a driving pulley 37 which is provided on the power take-off shaft of the tractor. This shaft projects longitudinally from the rear of the tractor. Due to the engagement of the belt with the driving pulley, the idler pulleys are held back while the remainder of the machine continues to rise. As a result of this the belt-clamping device 31 is moved away from the idler pulleys so as to release the belt for operative movement by the driving pulley, and the two arms 23 and 24 of the swinging-arm assembly are straightened out, somewhat in the manner of a toggle joint, so as to produce a forward movement of the idler pulleys which brings them to a position above the driving pulley such that the belt leads vertically to and from this pulley as shown in Fig. 3. When the arms 23 and 24 are straightened out, or nearly so, an abutment 38 which is adjustably secured to a bracket 39 welded on the forward end of the arm 24 engages the arm 23, so that during the final stage of the machine's movement into its operative position the two arms are together held down by the driving belt against the pressure of the coil springs 28 acting on the arm 24. The longitudinal bar 9 to which the arm 24 is pivotally attached is thus moved on away from said arm to leave the idler pulleys free to tension the belt under the upward pressure of the springs 28 acting through the two arms 23 and 24. In this tensioning action the swinging-arm assembly pivots about the point of contact of the rear end of arm 24 with the bar 9. The tension on the driving belt can be varied by altering the compression on the springs 28; by adjusting the abutment 38 vertically on the bracket 39; or by vertical adjustment of the operative position of the machine relative to the power take-off shaft, which is done by selecting a different pair of the holes 5 for engagement with the pins 6 on the arms of the hydraulic lift.

When the machine is lowered to its inoperative position the above operations are reversed and automatically cause the disengagement of the belt from the driving pulley on the power take-off shaft. The rearward movement imparted to the idler pulleys during the lowering of the machine carries them well clear of the driving pulley so that there is no danger of them fouling it.

The position of the idler pulleys in relation to the driving pulley when the machine is in its operative position is determined by the longitudinal adjustment of the swinging-arm assembly 21. This adjustment is used to ensure that the driving belt has a good lead to and from the driving pulley.

The swinging-arm assembly 21, including the belt-clamping device 31, can be readily applied to a machine for cutting weeds, grass, or like vegetable ground growth, in which a rotary cutter is supported by a frame for rotation about a vertical axis, the machine being carried on the hydraulic lift of a tractor and being movable vertically thereby between an inoperative position, in which it is clear of the ground, and a cutting position adjacent the ground. In such application the swinging-arm assembly is inverted from the position shown in the drawings and is supported on top of a fixed member, which can be the bar 9 similarly inverted. This arrangement operates in a manner similar to that described above, except that the directions of the various vertical movements in the different stages of the operation are reversed. Thus, when the cutting machine is in its inoperative position, a bight is found in the belt for engagement with the top of the driving pulley as the machine is lowered by the hydraulic lift into its operative cutting position. When the machine is raised back into its inoperative position the bight is again formed so that the belt is disengaged from the driving pulley.

I claim:

1. An agricultural machine having means for carrying it on an hydraulic lift on a tractor for raising the machine to an operative position and for lowering the machine to an inoperative position and the tractor having a power take-off shaft and a driving pulley thereon, said machine embodying a rotary device, and a belt and pulley system for transmitting drive from the driving pulley on the tractor take-off shaft to the rotary device on the machine, said drive transmitting system comprising a driven pulley connected to said rotary device on the machine, a belt passing around said driven pulley, a pair of laterally spaced idler pulleys for guiding the belt around the driving and driven pulleys while the machine is in raised operative position, a clamping device mounted on the machine to cooperate with the idler pulleys to clamp the belt when the machine is lowered to inoperative position and thereby form a bight in the belt in a position free of contact with the driving pulley but in a position for movement into driving engagement with the said driving pulley when the machine is lifted to operative position, and means for mounting the idler pulleys and clamping device on the machine for lifting and lowering movements therewith comprising a bar of inverted channel section fixed longitudinally on the machine, a spring-loaded arm carrying said idler pulleys and belt clamping device and having pivot means for attaching it to said bar, said arm nesting beneath said bar and being guided by the side flanges thereof for pivotal movement and said bar having a longitudinal slot therein, said pivot means for said arm engaging in said slot in said bar to permit adjustment of the idler pulleys and clamping device longitudinally of the machine, and a vertical spindle on said bar rotatably supporting said rotary device and driven pulley on the machine.

2. An agricultural machine having means for carrying it on an hydraulic lift on a tractor for movement thereby into a raised operative position and into a lowered inoperative position and the tractor having a power take-off shaft and a driving pulley thereon, said machine embodying a rotary device, and a belt and pulley system for transmitting drive from the driving pulley on the tractor take-off shaft to the rotary device on the machine, said belt and pulley system comprising a driven pulley connected to said rotary device, a belt passing around said driven pulley, a pair of laterally spaced idler pulleys for the belt, a spring-loaded arm which pivotally supports the idler pulleys on the machine for raising and lowering movement therewith and for yieldably tensioning the belt on the driving and driven pulleys while the machine is in raised operative position, and a device mounted on the machine in a position to clamp the belt against the idler pulleys when the machine is lowered to inoperative position and the idler pulleys are retracted so as to form a bight in the belt which projects from the idler pulleys into a position free of contact with the driving pulley but for movement into driving engagement with the driving pulley when the machine is lifted to operative position.

References Cited in the file of this patent

UNITED STATES PATENTS

| | | |
|---|---|---|
| 529,875 | Parker et al. | Nov. 27, 1894 |
| 1,978,526 | Eppler | Oct. 30, 1934 |
| 2,632,651 | Rittenhouse | Mar. 24, 1953 |
| 2,659,447 | Wetmore | Nov. 17, 1953 |
| 2,755,002 | Gustafson | July 17, 1956 |

FOREIGN PATENTS

| | | |
|---|---|---|
| 683,299 | Great Britain | Nov. 26, 1952 |